United States Patent

Bonteil

[15] 3,670,520
[45] June 20, 1972

[54] INSTALLATION FOR FREEZING A LIQUID OR SEMI-LIQUID PRODUCT

[72] Inventor: Robert C. Bonteil, Clichy, France

[73] Assignee: Societe D'Etudes Et D'Exploitation De Procedes Pour L'Industrie Alimentaire Sepial, Clichy, France

[22] Filed: Feb. 13, 1970

[21] Appl. No.: 11,120

[30] Foreign Application Priority Data

April 2, 1969 France..................................6909973

[52] U.S. Cl......................................62/314, 62/57, 62/347, 99/197
[51] Int. Cl................................................F28d 5/00
[58] Field of Search......................34/5; 62/57, 74, 171, 314, 62/347; 99/197

[56] References Cited

UNITED STATES PATENTS

| | | | |
|---|---|---|---|
| 3,313,032 | 4/1967 | Malecki | 34/5 |
| 3,507,128 | 4/1970 | Murphy et al. | 62/63 |
| 2,757,126 | 7/1956 | Cahn | 62/57 X |
| 3,024,117 | 3/1962 | Barlow | 62/74 X |
| 3,319,344 | 5/1967 | Sachsel et al. | 62/57 X |
| 3,404,541 | 10/1968 | Y Bot-Langlet | 62/74 X |
| 3,427,816 | 2/1969 | Hanny et al. | 62/74 |

*Primary Examiner*—Meyer Perlin
*Assistant Examiner*—Ronald C. Capossela
*Attorney*—Woodhams, Blanchard and Flynn

[57] ABSTRACT

The invention concerns an installation for freezing a liquid or semi-liquid product comprises a vessel in the form of a vertical tower through which a rising current of cold gas may pass to superficially freeze the droplets, an atomizer in the upper portion of the vessel for atomizing the product into droplets, a fluidization plate disposed in the lower portion of the vessel for collecting superficially frozen atomized droplets in a fluidized bed in which the freezing of the superficially frozen droplets is completed.

1 Claim, 2 Drawing Figures

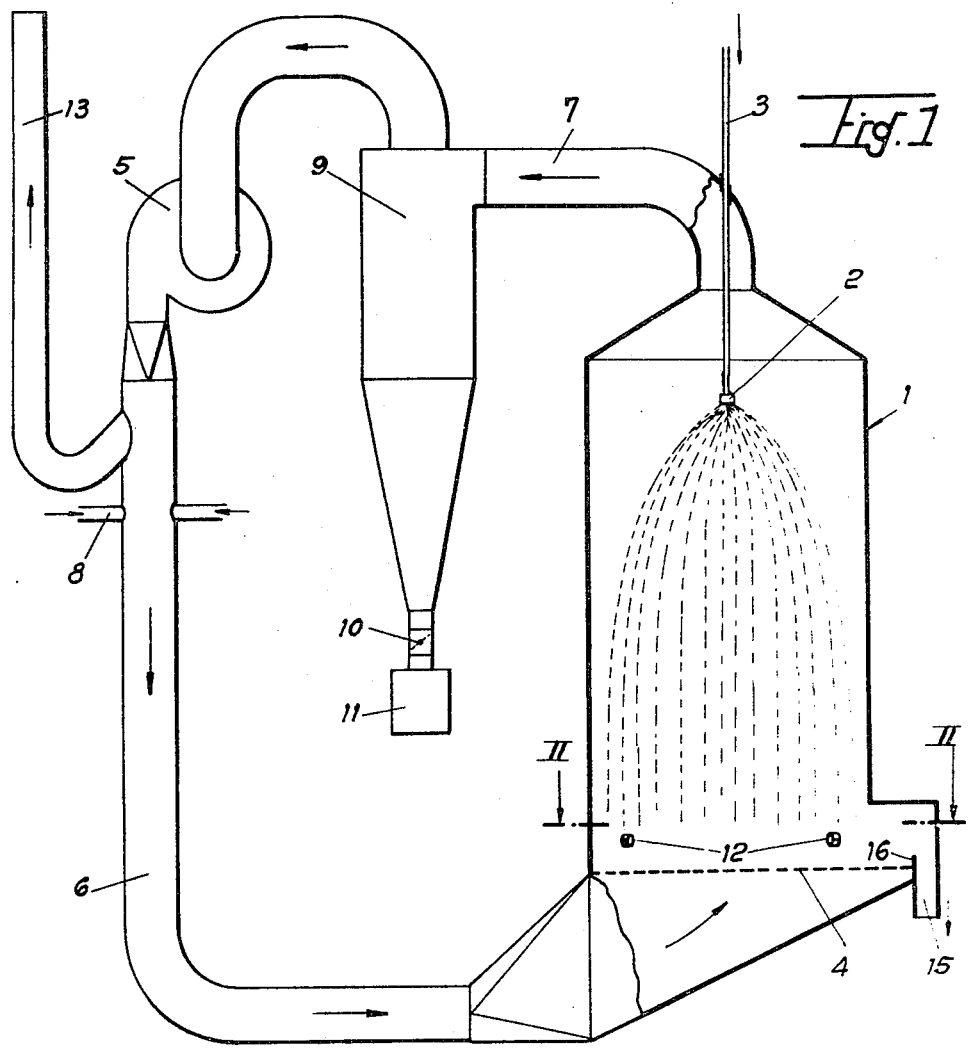
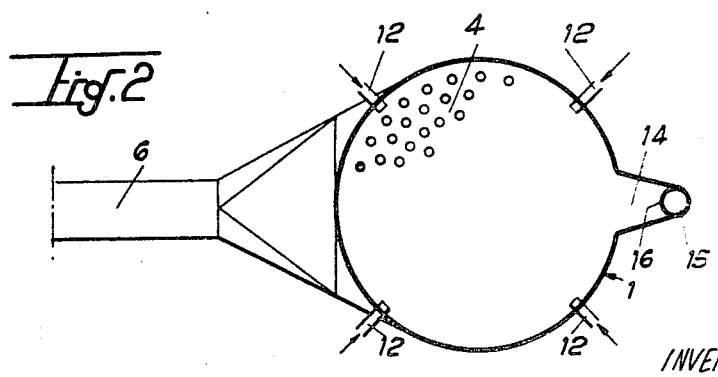

INSTALLATION FOR FREEZING A LIQUID OR SEMI-LIQUID PRODUCT

The present invention relates to an installation for freezing a liquid or semi-liquid product.

Processes are, in general, known for freezing liquid or semi-liquid food products, such as, for example, milk, coffee, fruit juices, etc. Frozen droplets are obtained from such processes, and these droplets are then subjected to drying in a vacuum for the purpose of effecting lyophilisation of the product.

It is known that in the process of freezing a droplet it is possible to distinguish two principal phases, namely a first, very rapid phase, during which the cooling and superficial freezing of the droplet are effected, and a second, longer phase, during which the freezing is continued and the refrigeration of ice is effected. This second phase, which depends essentially on the size of the atomized droplets, is much longer than the first, particularly if the final temperature of the droplets must be close to that of the coolant used.

It has been necessary in known installation to use vessels of large dimensions in order to increase the residence time of the droplets in a current of cold gas to effect complete freezing of the droplets. When it is desired to obtain frozen droplets which are relatively large, the dimensions of the vessel required becomes entirely prohibitive.

According to one particular aspect of the present invention, to which, however, the invention is in no way restricted, there is provided a process of freezing a liquid or semi-liquid product comprising the steps of atomizating the product into droplets, superficially freezing the droplets in a current of cold gas, collecting the superficially frozen atomized droplets in a fluidized bed, and completing the freezing of the atomized droplets which are then discharged.

According to another non-restrictive aspect of the present invention, there is provided an installation for freezing a liquid or semi-liquid product comprising a vessel in the form of a vertical tower through which a rising current of cold gas may pass to superficially freeze the droplets, an atomizing device in the upper portion of the vessel for atomizing the product into droplets, a fluidization plate disposed in the lower portion of the vessel for collecting superficially frozen atomized droplets in a fluidized bed, blower means for blowing at least a part of the cold gas through the fluidization plate to complete the freezing of the droplets, and discharge means for continuously discharging the frozen atomized droplets from the installation plate.

The atomized droplets are thus first superficially frozen during their vertical fall in the rising current of cold gas, and then accumulate at the lower portion of the vessel over the fluidization plate, where their freezing is completed during a longer or shorter period of time before they are discharged from the installation.

With the device of the invention it is, therefore, possible to obtain perfectly frozen and relatively large droplets without the dimensions of the freezing vessel being excessive. The height of the vessel is in fact dependent only on the duration of fall necessary for the atomized droplets to become superficially frozen, and it is known that this phase of the freezing is extremely rapid.

The fluidization plate preferably, in operation, provides a temperature homogenization zone.

By means of this arrangement, all the frozen droplets leave the vessel at the same temperature. In addition, the risk that droplets falling near the discharge means will be discharged too rapidly, before being perfectly frozen, is thus avoided.

At least one nozzle may be disposed in the lower portion of the vessel above the fluidization plate, to inject into said vessel a cold gas the temperature of which is lower than that of the cold gas which is blown through the fluidization plate.

The atomized droplets are thus superficially frozen with gases having a lower temperature than that of the gases cooling the superficially frozen droplets on the fluidization plate, so that it is possible to increase the thermal efficiency of the installation and reduce the time of fall of these droplets, so that the height of the vessel can be further reduced.

The invention is illustrated, merely by way of example, in the accompanying drawings, in which:

FIG. 1 is a diagrammatic sectional view of an installation for freezing a liquid or semi-liquid product according to the invention, and FIG. 2 is a partial view in section along the line II—II of FIG. 1.

The installation is composed essentially of a cylindrical freezing vessel 1 in the form of a vertical tower, in the upper portion of which there is disposed an atomizing device 2 supplied through a pipe 3 with a liquid or semi-liquid product to be frozen. In the lower portion of the vessel 1 there is disposed a horizontal fluidization plate 4 consisting of a perforated plate occupying the entire cross-section of the vessel.

A centrifugal fan 5 is connected by a pipe 6 to the bottom portion of the vessel and enables a cold gas, for example nitrogen, to be blown under the fluidization plate 4. This fan also effects the recycling of the gas through a pipe 7 communicating with the vessel 1 at its upper portion. A rising current of cold gas thus passes permanently through the vessel. The recycled gas is cooled at 8 by means of a suitable cooling device (not shown), while a cyclone separator 9 provided with a valve 10 and a recuperation chamber 11 is inserted in the pipe 7 in order to eliminate excessively fine droplets which may be formed during the atomization.

The vessel 1 contains, in addition, in its lower portion, a series of nozzles 12 leading into the interior of the vessel above the fluidization plate 4. These nozzles are supplied with a cold gas from an external source (not shown), the cold gas preferably being of the same nature as that which is blown through the fluidization plate 4, but at a lower temperature than the latter for a reason which will appear more clearly later on. A portion of the gas is not recycled through the pipe 6 and this portion escapes to the atmosphere through a discharge flue 13.

On its periphery the fluidization plate 4 is provided with a V-shaped extension 14 (FIG. 2), which constitutes a temperature homogenization zone. Beyond this extension 14 there is situated a vertical discharge pipe 15 through which the frozen droplets of product are discharged from the vessel 1, for example, to a vacuum drying chamber in the case of lyophilisation. The surface of the plate 4 is separated from this discharge pipe 15 by a vertical rim 16 of small height.

The installation which has just been described operates in the following manner:

The liquid or semi-liquid product to be frozen is supplied through the pipe 3 to the atomizing device 2, which atomizes it into droplets, directed towards the lower portion of the vessel 1. The fall of these atomized droplets is considerably slowed down by the rising current of cold gas supplied by the centrifugal fan 5, so that when they arrive at the lower portion of the vessel 1 they are already superficially frozen. It is known that this first phase of the freezing of the droplets is extremely rapid. When the superficially frozen atomized droplets reach the bottom of the vessel 1, they are collected on the fluidization page 4, where their freezing is completed. The droplets are in fact maintained on this plate in the form of a fluidized bed suspended in the current of cold air blown by the fan 5. The droplets are held on the fluidization plate at least for a certain time because of the rim 16. The droplets are therefore perfectly frozen whatever their size, and they flow gradually after the manner of a fluid to the discharge pipe 15, passing over the rim 16.

It is quite evident that, depending on the part of the fluidization plase 4 on which they fall, all the droplets do not take the same time to arrive at the discharge pipe 15. The extension 14 has precisely the object of homogenizing the temperature of the droplets, all of which thus leave the vessel 1 at the same temperature. The extension 14 also ensures that all the droplets discharged are perfectly frozen. The length of this extension is in fact such that superficially frozen atomized droplets falling on the fluidization plate 4 near the extension 14 take sufficient time to travel over the extension to the discharge pipe 15 to be perfectly frozen. The installation therefore makes it possible to obtain perfectly frozen and relatively large droplets without the dimensions of the freezing vessel 1 being excessive. The height of this vessel 1 must in fact be such that the atomized droplets are simply frozen superficially when they arrive at the lower portion of the vessel freezing being completed on the fluidization plate 4. The speed of the cold gas circulating from the lower portion to the upper portion of the vessel is regulated by means of the centrifugal fan 5 in such a manner that the fall of the atomized droplets is considerably slowed down, without however any entrainment in the gas occurring. It will finally be noted that the injection through the nozzles 12 of cold gas at a temperature lower than that of the gas which is blown through the fluidization plate 4 for the cooling of the superficially frozen atomized droplets makes it possible not only to increase the thermal efficiency of the installation, but also to reduce the duration of the fall of the atomized droplets because it accelerates the superficial freezing. As a result it is possible still further to reduce the height of the vessel 1.

Any excessively fine droplets which may be formed during the atomization are entrained with the gas and pass into the pipe 7, where they are removed from the gas by the cyclone separator 9 to prevent them being recycled through the pipe 6. The product may, if desired, be recovered in the recuperation chamber 11 and then reinjected into the vessel 1 through the pipe 3.

What is claimed is:

1. An installation for freezing a liquid or semi-liquid product comprising a vessel in the form of a vertical tower through which a rising current of cold gas may pass to superficially freeze liquid droplets, an atomizing device in the upper portion of the vessel for atomizing the product into droplets, a fluidization plate disposed in the lower portion of the vessel for collecting superficially frozen atomized droplets in a fluidized bed, blower means for blowing at least a part of a cold gas upwardly through the fluidization plate to complete the freezing of the droplets as disposed within the fluidized bed, nozzle means disposed adjacent the lower portion of the vessel above the fluidization plate for injecting into the vessel a cold gas the temperature of which is lower than that of the cold gas which is blown upwardly through the fluidization plate to assist in completely freezing the droplets contained in the fluidized bed, discharge means associated with said fluidized bed for continuously discharging the completely frozen atomized droplets from the fluidization plate, and said fluidization plate including means disposed between said fluidized bed and said discharge means for providing a temperature homogenization zone for permitting all of the frozen droplets to attain substantially the same temperature prior to being supplied to said discharge means.

* * * * *